United States Patent [19]
Louie et al.

[11] Patent Number: 5,591,540
[45] Date of Patent: Jan. 7, 1997

[54] PACKAGING FOR AN ELECTROCHEMICAL DEVICE AND DEVICE USING SAME

[75] Inventors: Edmond Louie, Lawrenceville; Veronica R. Reichert, Bethlehem; Anaba A. Anani, Norcross; Jinshan Zhang, Duluth, all of Ga.

[73] Assignee: Motorola, Inc., Schaumburg, Ill.

[21] Appl. No.: 494,463

[22] Filed: Jun. 26, 1995

[51] Int. Cl.$^6$ ............................................. H01M 2/02
[52] U.S. Cl. ................. 429/163; 429/162; 425/35.2; 425/35.7; 425/35.9; 425/36.7
[58] Field of Search .................... 429/162, 163, 429/176, 129, 179; 428/35.2, 35.4, 35.7, 35.8, 35.9, 36.6, 36.7

[56] References Cited

U.S. PATENT DOCUMENTS

| | | | |
|---|---|---|---|
| 4,935,317 | 6/1990 | Fauteux et al. | 429/192 |
| 5,057,385 | 10/1991 | Hope et al. | 429/162 |
| 5,143,763 | 9/1992 | Yamada et al. | 428/36.2 |
| 5,153,038 | 10/1992 | Kuyama et al. | 428/35.8 |
| 5,326,652 | 7/1994 | Lake | 429/127 |
| 5,445,856 | 8/1995 | Chaloner-Gill | 428/35.9 |

*Primary Examiner*—M. Nuzzolillo
*Attorney, Agent, or Firm*—Kenneth M. Massaroni

[57] ABSTRACT

An electrochemical charge storage device (10) includes first and second electrodes (16) (22) with first and second current collectors (18) (24) respectively attached, an electrolyte (20) disposed between the electrodes and first and second metal foils (14) (26) to separate the electrodes (16) (22) from a packaging material. The packaging material consists of multilayered first and second polymeric packaging films (12) (28) which enclose the other components of the device (10), and are sealed to each other.

30 Claims, 4 Drawing Sheets

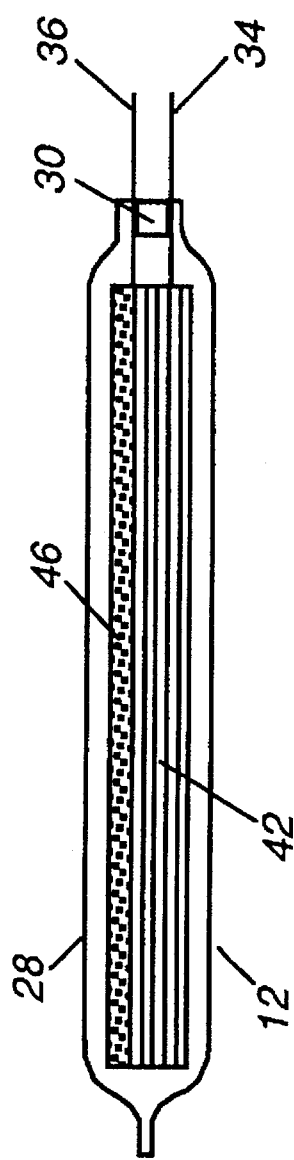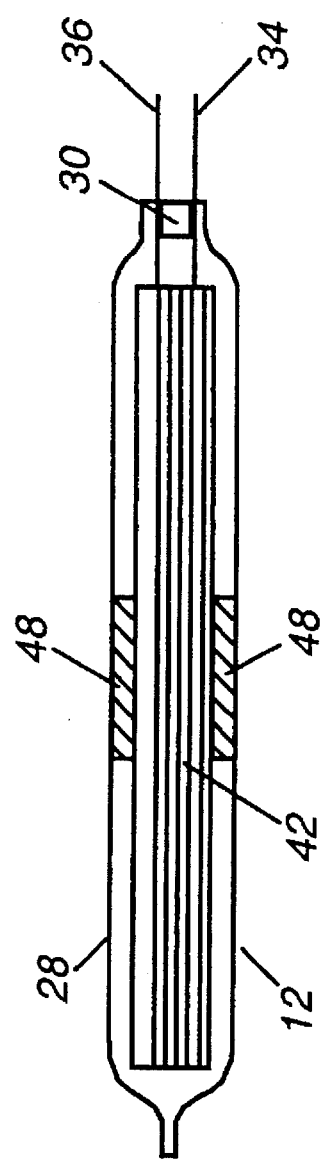

PACKAGING FOR AN ELECTROCHEMICAL DEVICE AND DEVICE USING SAME

TECHNICAL FIELD

This invention relates in general to electrochemical charge storage devices, and particularly to packages for electrochemical charge storage devices.

BACKGROUND OF THE INVENTION

As electronic devices and other electrical apparatuses increasingly become portable, advances must be made in energy storage devices to enable such portability. Indeed it is often the case with current electronics technology that the limiting factor to portability of a given device is the size and weight of the associated energy storage device. Obviously a small energy storage device may be fabricated for a given electrical device, but at the cost of energy capacity. The result is that either the energy source is too bulky, too heavy, or it does not last long enough. The main energy storage device used for portable electronics is the electrochemical battery cell, and less frequently, the electrochemical capacitor.

One limiting feature of current battery cells is the packaging of the electrochemical system. The current convention is to house the electrodes and electrolyte in a steel can. This form of packaging is commercially available in a wide variety of shapes and sizes. In the past this has forced designers to design electrical products around the cells, rather than design the product the way they would prefer, adding the energy source later. Additionally, the can adds a significant amount of weight to the cell, which is a marketing drawback.

Therefore there exists a need for a new packaging material for an energy source. This material should provide a lightweight package that is flexible, or otherwise conformal, inexpensive, and can be processed with plastic processing techniques and tools. Further, as is standard with current energy storage device packaging technology, the material must not react with the chemical system of the energy storage device, and should resist attack from common solvents.

BRIEF DESCRIPTION OF THE DRAWINGS

FIG. 5 is a cross-sectional side view of an electrochemical charge storage device incorporating a porous spacer in accordance with a second embodiment of the invention; and FIG. 6 is a cross-sectional side view of an electrochemical charge storage device incorporating a membrane vent in accordance with a third embodiment of the invention.

DETAILED DESCRIPTION OF THE PREFERRED EMBODIMENT

Figure 1:
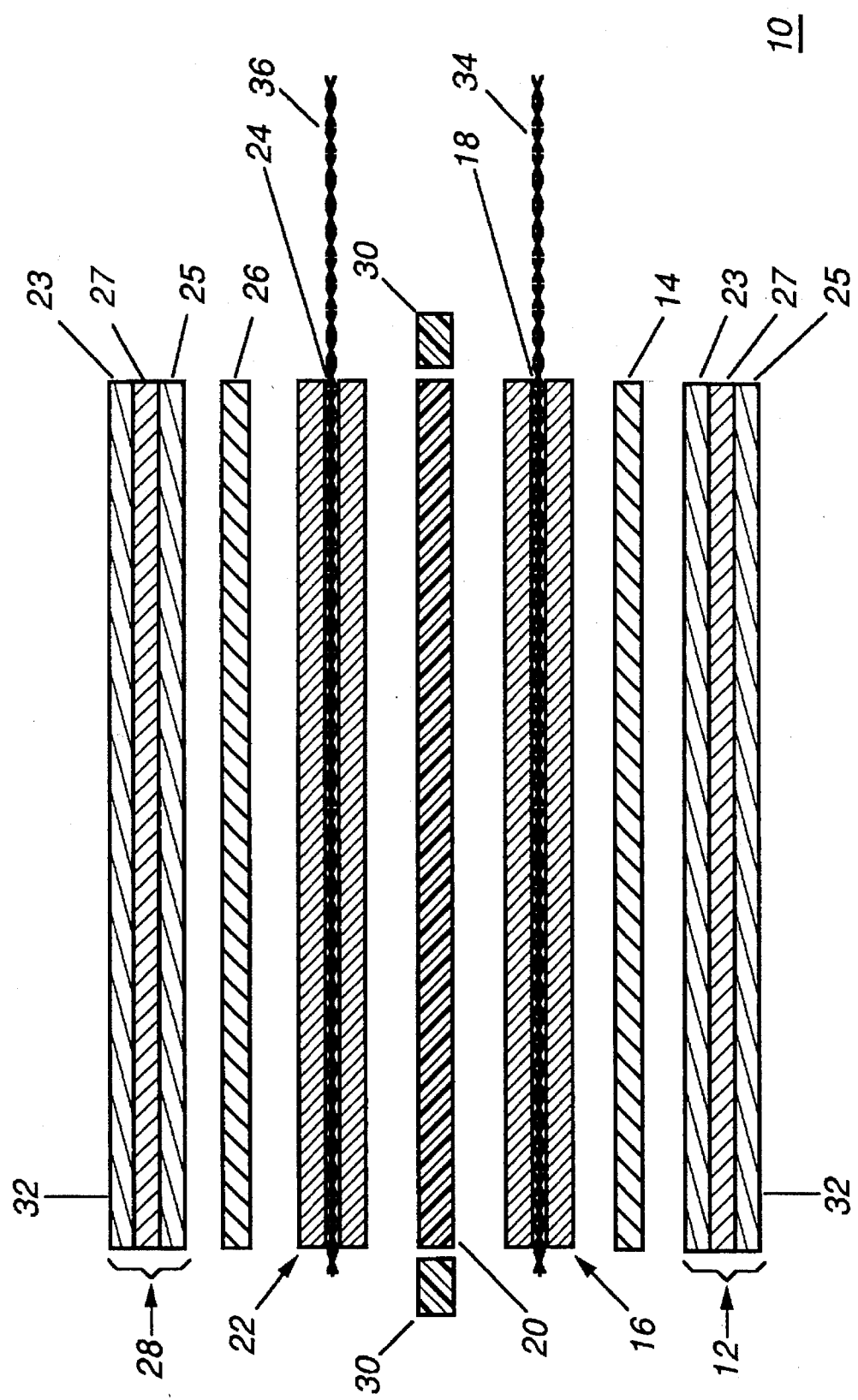
FIG. 1 is an exploded side view of an electrochemical charge storage device in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an exploded side view of an electrochemical charge storage device 10 in accordance with the invention. The device 10 comprises first polymeric packaging film 12, first metal foil 14, first electrode 16, first current collector 18, electrolyte 20, second electrode 22, second current collector 24, second metal foil 26, second polymeric packaging film 28, and polymer sealing strip 30.

The first polymeric packaging film 12 and second polymeric packaging film 28 are fabricated of a polymeric material having a water vapor permeability of less than 2.0 $g/m^2$ day, and preferably less than 1.0 $g/m^2$ where day for water vapor transmission measurement is defined as 1 atmosphere pressure, 1 mm thick film, and 95% relative humidity. The material must also have an oxygen vapor permeability of less than $200/m^2$ day, and preferably less than 150 $mL/m^2$ where day for oxygen vapor transmission measurement is defined as 1 atmosphere pressure, 1 mm thick film, and 75% relative humidity. Since it is difficult to find a single polymer having these properties, the first polymeric film and second polymeric film are each multi-layered polymeric materials or structures. The multilayered structure is formed by coextruding two or more polymers to make the packaging film having a composite thickness of less than about 5 millimeters (mm.), and preferably about 1 mm. It will occur to those skilled in the art that other thicknesses outside of this range may work as well.

Co-extrusion is a one step solvent free process and is well known in the art as a process for forming sheets of polymeric material. Preferably, the multilayered structure is a three-layered structure in which the first and third layers 23, 25 are fabricated of a polymer which gives the structures mechanical integrity, such as polyethylene or polypropylene. These polymers can each be coextruded with any of the following; polyvinylidene chloride, polyester, fluorocarbon resin, polyvinyl chloride, and polyvinylidene chloride methacrylate, each of which provide a vapor barrier. The first and third layers 23, 25 encapsulate or sandwich a second layer 27, fabricated of, for example, a layer of polyvinylidene chloride, to form a sheet of packaging film. The film is then cut into the required size and shape for a particular application. The polymer packaging films define a package perimeter at distal edges 32, thereof. The polymer packing films are preferably the same size and shape and thus correspond to each other when stacked vertically, one atop the other.

Optionally disposed atop first polymeric packaging film is first metal foil 14. The first metal foil 14 and second metal foil 26 are necessary only if the vapor barrier characteristics of polymeric packaging films is inferior to that described. In such a case, the metal foils act to enhance the vapor barrier quality. If used, the first metal foil will be located centrally on the first polymeric packaging film and is entirely within the distal perimeter. The foil thickness is generally less than 1 mm, and is preferably about 10 microns. It will occur to those skilled in the art that thicknesses outside of this range may be used without loss of performance.

An additional function of the foil, when used with inferior polymer packaging films, is to separate the first electrode front the first polymeric packaging film to prevent compatibility problems. The first and second metal foils are preferably formed of metals selected from the group of aluminum, copper, silver, gold, nickel, stainless steel, and combinations thereof. The interface between the first metal foil and the first polymeric packaging film should be free of any gas. The first metal foil and the second metal foil, described in greater detail hereinbelow, each have the same shape and define a common foil perimeter.

The first electrode 16 is disposed on the first metal foil within the foil perimeter. The first electrode is sized and shaped such that it is only slightly smaller than the first metal foil. The first current collector 18 is attached to the first electrode, and has a portion extending from the first electrode beyond the package perimeter 32, forming a first tab 34.

Figure 2:
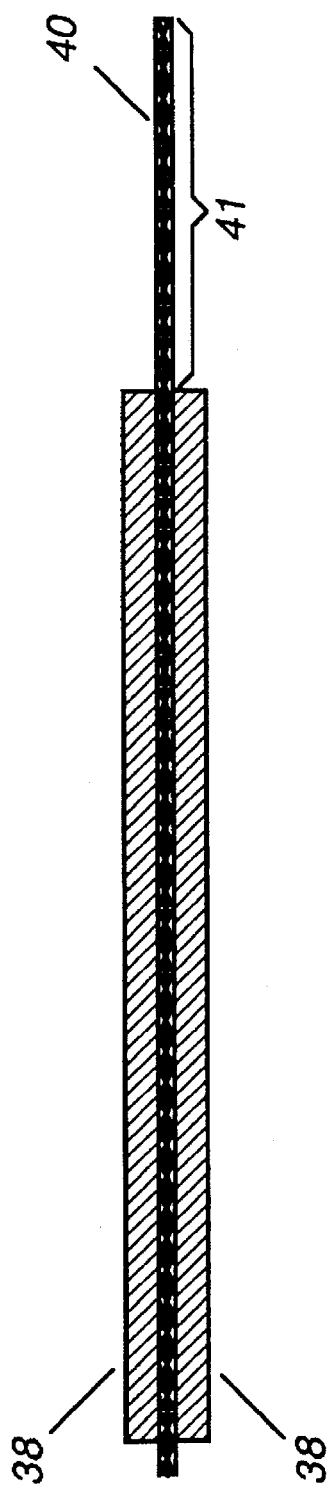
FIG. 2 is a side view of an electrode in accordance with a preferred embodiment of the invention.

In a preferred embodiment the electrodes 16 and 22 and the current collectors associated therewith are fabricated as shown in FIG. 2. Briefly, shown in FIG. 2 is a generic battery electrode 37 comprising a pair of electrode films 38, made of an electrochemically active material in a binder, and pressed onto a current collector 40. A commonly used binder for electrodes of this type is Teflon. The current collector 40 is generally flat, has a plurality of openings therethrough, and is preferably a wire mesh. Material for use as current collectors include nickel, copper, gold, silver, and stainless steel. The distal end portion 41 of current collector 40 is not coated with electrode materials, and is adapted to serve as tab or terminal 34. The electrode 37 is assembled by aligning the pair of electrode films 38 above and below the current collector 40 and heat pressing the electrode such that the pair of electrode films 38 bond to each other through the openings of the current collector 40. Both first electrode 16 and second electrode 22 are fabricated this way from different electrode materials, such that one electrode acts as a cathode and the other as an anode. Numerous such electrode materials and combinations exist and are well known in the art, such as NiOOH/metal hydride, NiOOH/Cd, and $LiNiO_2$/graphite or petroleum coke to name a few.

Returning now to FIG. 1, disposed over the first electrode 16 is electrolyte 20, which is either an aqueous electrolyte, a solid state electrolyte or a polymer gel electrolyte material. Various types of each electrolyte are well known in the art. By over, it is meant that, from a top plan view, no portion of the first electrode is visible, i.e., the first electrode is completely covered by electrolyte, with the first tab 34 extending outward from underneath the electrolyte. When the electrolyte is a solid state electrolyte it provides the function of separating the electrodes, as well as providing a conduction medium for electrochemical activity. Conversely, if the electrolyte is aqueous, then a separator, as is well known in the art, must be employed. For optimum performance, the electrolyte should be in intimate contact with first electrode and second electrode. If metal foils 14 and 26 are used, then, preferably, the electrolyte 20 also covers the first metal foil 14. Polymer and polymer gel electrolytes are known in the art, and are preferred due to their solid state conduction capability.

The second electrode is disposed on the electrolyte, is sized and shaped substantially as first electrode, and is positioned such that it corresponds with the first electrode. The first and second electrodes are made similarly, but of different electrochemically active material in the polymeric binder such that they provide a voltage potential. A second current collector 24 is attached to second electrode, and has a portion extending beyond the package perimeter, thereby forming a second tab 36. As in the first electrode, the portion extending beyond the package perimeter is not covered with electrode material. Second tab is horizontally offset from first tab 34 (as shown below) so that there is no vertical overlap. Alternatively, the tabs may protrude from different or opposite ends of the charge storage device. The second electrode is preferably fabricated as described above for first electrode 16, i.e., a pair of electrode films sandwiching a wire mesh current collector.

Optionally covering the second electrode is second metal foil 26, which is preferably just slightly larger than second electrode 22. As with the first metal foil, the second metal foil is only necessary when the polymer used for the packaging film does not provide sufficient barrier properties. The second metal foil additionally serves to separate the second electrode from the second polymeric packaging film, which is disposed thereover. The second polymeric packaging film is preferably fabricated from the same material as the first polymeric packaging film. The first and second polymeric films are positioned such they are vertically aligned for assembly.

To assemble the device, the first and second metal foils, first and second electrodes with attached first and second current collectors, and the electrolytes are arranged in a stacked configuration. The electrochemically active stack (42 of FIG. 3) is encapsulated or sandwiched between the first and second polymeric packaging films 12 and 28. The films may be sealed via conventional heating or other methods known in the art. In a preferred embodiment, the films are sealed by a vacuum heat sealing process, in which air and other gases are evacuated from the space to be packaged before final sealing. Alternatively, and since the first and second tabs extend out of the package, a polymer sealing strip 30 may be used to seal the area of the first and second tabs or the entire device. Once the stack is aligned between the packaging films, a heat press can be used around the edges of the package to seal the two packaging films together by forming a seam that extends continuously around the electrochemical charge storage device within the package perimeter, leaving first and second tabs extending therefrom.

Figure 3:
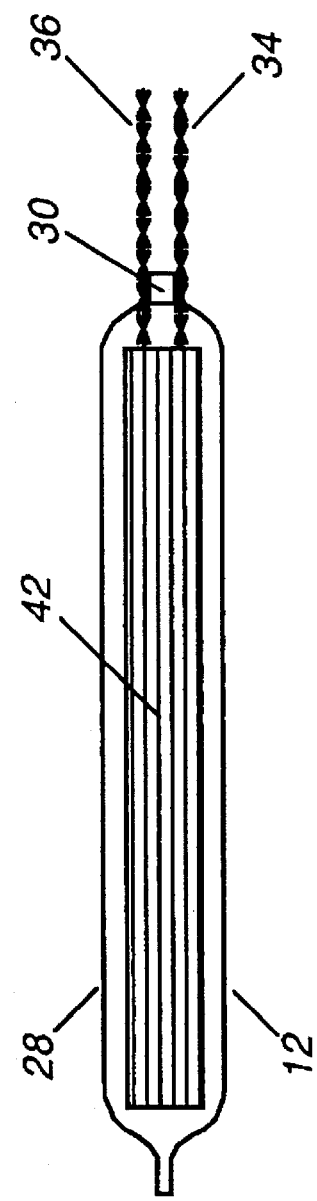
FIG. 3 is a cross-sectional side view of a sealed electrochemical charge storage device in accordance with the invention.
Figure 4:
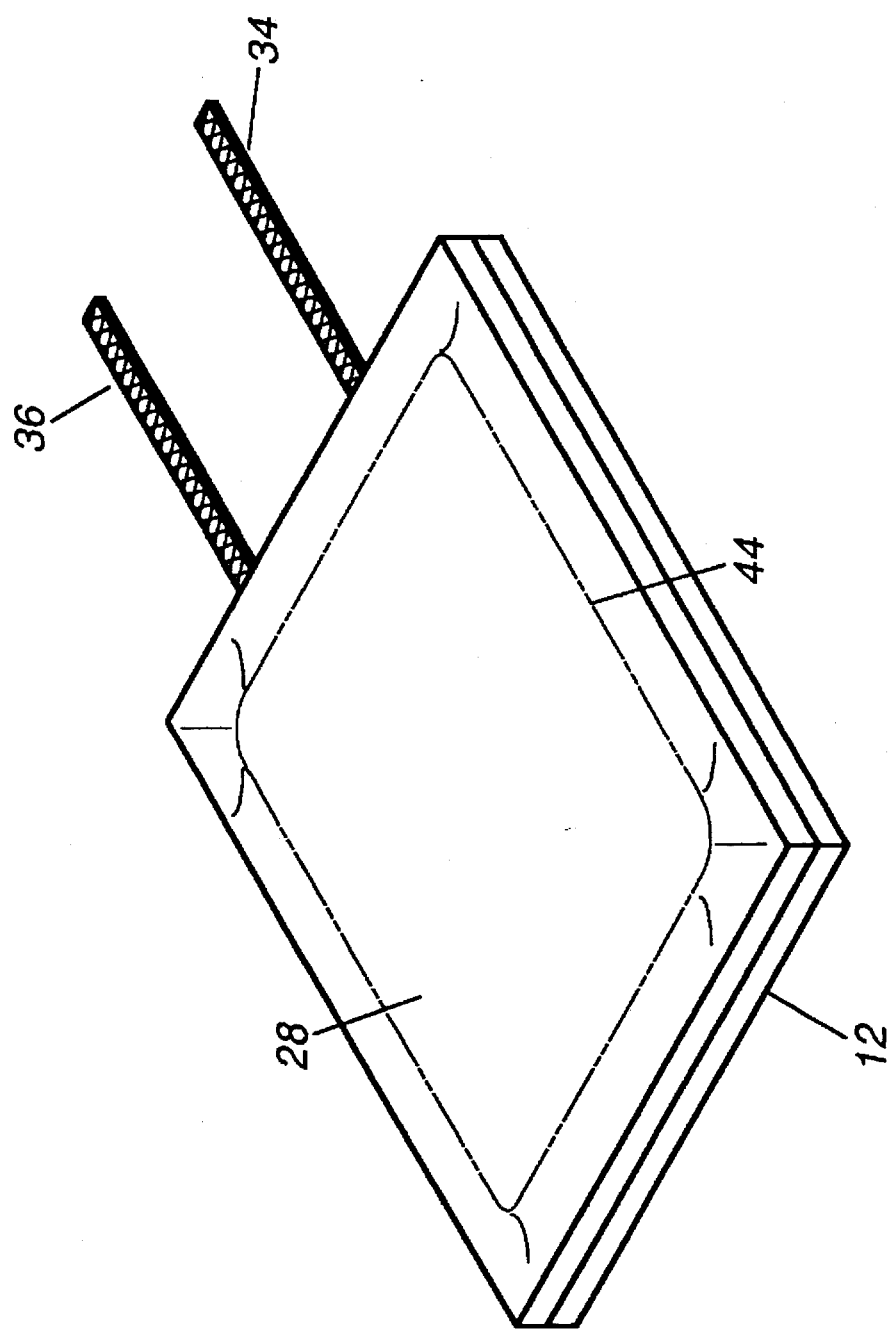
FIG. 4 is a perspective view of a sealed electrochemical charge storage device in accordance with the invention.

A cross sectional side view and a perspective view of an assembled electrochemical charge storage device are shown in FIGS. 3 and 4 respectively. Illustrated in FIG. 3 is a stack 42 disposed between first and second polymeric packaging films 12 and 28. First and second tabs 34 and 36 extend from the package, and the point where they exit the package is sealed by polymer sealing strip 30. Illustrated in FIG. 4 is the packaged device showing the first and second tabs 34 and 36 offset from each other as described previously. The first and second polymeric packaging films are sealed and the seam 44 which seals the packaging films together and extends continuously around the package.

An electrochemical charge storage device so packaged has a significant weight reduction advantage over charge storage devices packaged in metal cans. A device so packaged can be conformed to a given form factor, providing a weight advantage over metal foil packages, and has a great processing advantage over metal based packages. Also, as the contact tabs may come off different sides of the device, design flexibility is increased. Electrochemical charge storage devices which may advantageously employ this packaging include aqueous gel and solid state battery cells, and electrochemical capacitors, to name a few. It will occur to those skilled in the art which materials and specific thicknesses of the described element need to be employed to produce each of these devices. Each of these types of electrochemical charge storage devices can be made with flexible, i.e., conformable stacks, and thus may benefit from a polymeric package.

Some electrochemical charge storage devices produce gas when cycled. Thus, an apparatus for accommodating such gas can be included in the package. In FIG. 5 there is illustrated a side view of an electrochemical charge storage device including a gas handling apparatus. The device includes the electrochemically active stack 42. To manage gas production, a porous spacer 46 is placed at least adjacent one side of the stack 42. When the device is assembled, it is evacuated of all gas. As the device is cycled, any gas produced will be absorbed by the porous spacer. The porous spacer 46 may be made of a material which combines with the gas. In this way the package does not significantly expand during the useful life of the device. Materials that would be suited as the porous spacer are numerous and well known, examples of which include porous ceramic, silica, and cellulose. The only requirement, other than porosity, is that the material be inert with respect to the other materials of the device. Though only one porous spacer is shown in FIG. 5, it is to be understood that two or more such spacers may be employed on one or both sides of the stack.

Alternatively and referring now to FIG. 6, a vent or valve 48 can be employed to allow gas to escape from the device. The vent or valve 48 allows a one way passage of gas. A preferred vent means is a membrane of a vapor porous material that blocks the flow of liquid, such as expanded polytetrafluoroethylene, commonly known as Gore-Tex®. This material would be positioned over one or more holes or openings forward in the polymeric packaging film. The size of the holes and the number needed are dependent on the size and design of the electrochemical charge storage device. The vent is designed so that it would only allow gas out once a predetermined threshold pressure level is reached. Additionally, the vent may include an area conditioned as by scoring, so that if pressure increases to a point where the membrane vent cannot transmit enough vapor, the scored portion will rupture, and release built up pressure before an unsafe condition occurs. The vent may be provided through one or both packaging films.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A packaging material for an electrochemical charge storage device consisting of a multilayered polymeric material having a water vapor permeability of less than 2.0 g/m² day and an oxygen vapor permeability of less than 200 mL/m² day, wherein said electrochemical charge storage device is an aqueous battery, a gel battery, a solid state battery cell, or an electrochemical capacitor.

2. A packaging material for an electrochemical charge storage device as in claim 1, wherein said multilayered polymeric material is a three layered material.

3. A packaging material as in claim 2, wherein said three layered material includes a first and third layer consisting of polyethylene coextruded and encapsulating a second layer selected from the group consisting of polyvinylidene chloride, polyester, fluorocarbon resin, polyvinyl chloride, polyvinylidene chloride-methacrylate, and combinations thereof.

4. A packaging material as in claim 2, wherein said three layered material includes a first and third layer consisting of polypropylene coextruded and encapsulating a second layer selected from the group consisting of polyvinylidene chloride, polyester, fluorocarbon resin, polyvinyl chloride, polyvinylidene chloride-methacrylate, and combinations thereof.

5. A packaging material as in claim 1, wherein said material has a thickness of less than about 5 mm.

6. A packaging material as in claim 1, wherein said material has a thickness of 1 mm.

7. An electrochemical charge storage device, comprising:
   first and second electrodes, each of said electrodes having a current collector attached thereto;
   electrolyte disposed between said electrodes and in intimate contact with said electrodes; and
   a package for encapsulating said device consisting of a multilayered polymeric material.

8. An electrochemical charge storage device as defined in claim 7, wherein said multilayered polymeric material has a thickness of less than 5 mm.

9. An electrochemical charge storage device as defined in claim 7, wherein said multilayered polymeric material has a thickness of 1 mm.

10. An electrochemical charge storage device as defined in claim 7, wherein said multilayered polymeric material has a water vapor permeability of less than 2.0 g/m² day and an oxygen vapor permeability of less than 200 mL/m² day.

11. An electrochemical charge storage device as defined in claim 7, wherein said multilayered polymeric material is a three layered material.

12. An electrochemical charge storage device as defined in claim 11, wherein said three layered material includes a first and third layer consisting of polyethylene coextruded and encapsulating a second layer selected from the group consisting of polyvinylidene chloride, polyester, fluorocarbon resin, polyvinyl chloride, polyvinylidene chloride-methacrylate, and combinations thereof.

13. An electrochemical charge storage device as defined in claim 11, wherein said three layered material includes a first and third layer consisting of polypropylene coextruded and encapsulating a second layer selected from the group consisting of polyvinylidene chloride, polyester, fluorocarbon resin, polyvinyl chloride, polyvinylidene chloride-methacrylate, and combinations thereof.

14. An electrochemical charge storage device as defined in claim 7, further comprising a first metal foil disposed between said first electrode and said package, and a second metal foil disposed between said second electrode and said package.

15. An electrochemical charge storage device as defined in claim 14, wherein said first and second metal foils are each made of a metal selected from the group consisting of nickel, copper, aluminum, stainless steel, gold, silver, and combinations thereof.

16. An electrochemical charge storage device as defined in claim 7, further comprising a porous spacer disposed between said polymeric packaging film and one of said electrodes.

17. An electrochemical charge storage device as defined in claim 7, further including a membrane vent disposed over an opening said polymeric material.

18. An electrochemical charge storage device, comprising:
   first packaging film consisting of a multilayered polymeric material, and defining a package perimeter;
   a first electrode disposed on said first packaging film within said package perimeter, and including a first current collector having a tab extending therefrom and beyond said package perimeters;
   second electrode including a second current collector having a tab extending therefrom beyond said package perimeter, said second tab being disposed offset from said first tab;
   an electrolyte disposed in contact with said first and second electrodes;

second packaging film consisting of said multilayered polymeric material, and disposed on said second electrode;

wherein said first and second packaging films are sealed to each other forming a seam, said seam extending substantially continuously around said electrochemical charge storage device and said first and second tabs extending therefrom.

19. An electrochemical charge storage device as defined in claim 18, wherein said multilayered polymeric material has a water vapor permeability of less than 2.0 g/m$^2$ day and an oxygen vapor permeability of less than 200 mL/m$^2$ day.

20. An electrochemical charge storage device as defined in claim 18, wherein said multilayered polymeric material is a three layered material.

21. An electrochemical charge storage device as defined in claim 20, wherein said three layered material includes a first and third layer consisting of polyethylene coextruded and encapsulating a second layer selected from the group consisting of polyvinylidene chloride, polyester, fluorocarbon resin, polyvinyl chloride, polyvinylidene chloride-methacrylate, and combinations thereof.

22. An electrochemical charge storage device as defined in claim 20, wherein said three layered material includes a first and third layer consisting of polypropylene coextruded and encapsulating a second layer selected from the group consisting of polyvinylidene chloride, polyester, fluorocarbon resin, polyvinyl chloride, polyvinylidene chloride-methacrylate, and combinations thereof.

23. An electrochemical charge storage device as defined in claim 18, wherein said multilayered polymeric material has a thickness in of less than about 5 mm.

24. An electrochemical charge storage device as defined in claim 18, wherein said multilayered polymeric material has a thickness of about 1 mm.

25. An electrochemical charge storage device as defined in claim 18, wherein said first and said second electrodes each comprise a pair of electrode films, said first and said second current collectors having a plurality of openings found therethrough, said first and second current collectors each disposed between a pair of electrode films.

26. An electrochemical charge storage device as defined in claim 18, further comprising a porous spacer disposed between said first polymeric packaging film and said first electrode.

27. An electrochemical charge storage device as defined in claim 18, wherein said first polymeric packaging film further comprises means for venting gas generated by said electrochemical charge storage device.

28. An electrochemical charge storage device as defined in claim 27, wherein said venting means comprises, a membrane vent disposed in an opening formed through said packaging film.

29. An electrochemical charge storage device as defined in claim 18, further comprising a first metal foil disposed between said first packaging film and said first electrode, and a second metal foil disposed between said second packaging film and said second electrode.

30. An electrochemical charge storage device as defined in claim 29, wherein said first and second metal foil are fabricated from a metal selected from the group consisting of aluminum, copper, nickel, gold, silver, stainless steel, and combinations thereof.

* * * * *